(12) United States Patent
Chen et al.

(10) Patent No.: US 10,727,003 B2
(45) Date of Patent: Jul. 28, 2020

(54) CORD-YARN STRUCTURED SUPERCAPACITOR

(71) Applicant: Board of Regents, The University of Texas System, Austin, TX (US)

(72) Inventors: Jonathan Y. Chen, Austin, TX (US); Yuxiang Huang, Austin, TX (US); Yue Liu, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/723,513

(22) Filed: Oct. 3, 2017

(65) Prior Publication Data

US 2018/0096799 A1     Apr. 5, 2018

Related U.S. Application Data

(60) Provisional application No. 62/403,455, filed on Oct. 3, 2016.

(51) Int. Cl.
    *H01G 11/22*      (2013.01)
    *H01G 11/32*      (2013.01)
    (Continued)

(52) U.S. Cl.
CPC ............. *H01G 11/40* (2013.01); *D01F 9/14* (2013.01); *D01F 9/20* (2013.01); *D02G 3/04* (2013.01); *D02G 3/36* (2013.01); *D02G 3/40* (2013.01); *D02G 3/441* (2013.01); *H01G 11/22* (2013.01); *H01G 11/32* (2013.01); *H01G 11/34* (2013.01); *H01G 11/56* (2013.01); *H01G 11/84* (2013.01); *H01G 11/86* (2013.01); *D01D 5/26* (2013.01); *D10B 2101/12* (2013.01); *Y02E 60/13* (2013.01)

(58) Field of Classification Search
CPC ........ H01G 11/00; H01G 11/32; H01G 11/40; H01G 11/22; H01G 11/30; H01G 11/34; H01G 11/56; H01G 11/86; D01F 9/20; D02G 3/36; D02G 3/04; D02G 3/40
USPC .................. 361/502, 503, 523; 29/25.03
See application file for complete search history.

(56) References Cited

FOREIGN PATENT DOCUMENTS

EP     2894644 A1 * 7/2015 ............. H01G 11/32

OTHER PUBLICATIONS

Huang, Yuxiang et al., "Biobased Nano Porous Active Carbon Fibers for High-Performance Supercapacitors," ACS Applied Materials & Interfaces, ACS Publications, 2016, pp. A-K.

Wang, Gongming et al., Solid-State Supercapacitor Based on Activated Carbon Cloths Exhibits Excellent Rate Capability, Adv. Mater., 2014, 26, 2676-2682.

Jin, H.Y. et al., "Controllable functionalized carbon fabric for highperformance all-carbon-based supercapacitors," RSC Adv., 2014, 4, 33022-33028.

(Continued)

*Primary Examiner* — Arun Ramaswamy
(74) *Attorney, Agent, or Firm* — Meunier Carlin & Curfman LLC

(57) ABSTRACT

Cord-yarn supercapacitors are disclosed herein. The cord-yarn supercapacitor can include two or more ply yarns twisted together and an electrolyte. The ply yarns can comprise an activated carbon fiber yarn and a non-activated carbon fiber yarn. The activated carbon fiber yarn can be derived from a staple yarn which has been carbonized and activated. The non-activated carbon fiber yarn can be derived from a multi filament yarn. The electrolyte can include a polymer gel. The cord-yarn supercapacitors disclosed herein provide a rope-format linear structure with great flexibility. This unique linear structure allows the supercapacitor to find use in applications such as apparel products, outdoor activity products, sports wears, and other industrial end uses. Methods of making cord-yarn supercapacitors are also disclosed.

20 Claims, 2 Drawing Sheets

| (51) | Int. Cl. | |
|---|---|---|
| | H01G 11/34 | (2013.01) |
| | H01G 11/40 | (2013.01) |
| | H01G 11/56 | (2013.01) |
| | H01G 11/86 | (2013.01) |
| | D01F 9/20 | (2006.01) |
| | D02G 3/04 | (2006.01) |
| | D02G 3/36 | (2006.01) |
| | D02G 3/40 | (2006.01) |
| | D01F 9/14 | (2006.01) |
| | H01G 11/84 | (2013.01) |
| | D02G 3/44 | (2006.01) |
| | D01D 5/26 | (2006.01) |

(56) References Cited

OTHER PUBLICATIONS

Lekakou, C. et al., "Carbon-Based Fibrous EDLC Capacitors and Supercapacitors," Journal of Nanotechnology, Hindawi Publishing Corporation, vol. 2011, Article ID 409382, 8 pages.

Jost, Kristy et al., "Natural Fiber Welded Electrode Yarns for Knittable Textile Supercapacitors," Adv. Energy Mater., 2014, 1401286, 8 pages.

Cai, Zhenbo et al., "Flexible, weavable and efficient microsupercapacitor wires based on polyaniline composite fibers incorporated with aligned carbon nanotubes," J. Mater Chem. A, 2013, 1, 258-261.

Zhai, Shengli et al., "All-carbon solid-state yarn supercapacitors from activated carbon and carbon fibers for smart textiles," Mater. Horiz., 2015, 2, 598-605.

* cited by examiner

US 10,727,003 B2

CORD-YARN STRUCTURED SUPERCAPACITOR

RELATED APPLICATION

This application claims priority to U.S. Patent Application No. 62/403,455, filed Oct. 3, 2016, entitled "Cord-Yarn Structured Supercapacitor," the contents of which are incorporated herein by reference.

FIELD

The present disclosure relates to supercapacitors, particularly to compositions and methods to produce a supercapacitor with cord-yarn materials.

BACKGROUND

The development of improved energy storage devices is one of the keys for successful global energy management. However, one challenge is the improvement of transportable energy in applications such as wearable energy. Many research efforts focus on either directly overlaying conventional batteries onto existing textiles or coating energy storage materials on fabrics. Such approaches face tremendous difficulties in connections, bulkiness, wearability, and safety. An emerging tactic is to directly incorporate energy storage materials, as supercapacitors, at the formation stages of textile fibers. Supercapacitors, like batteries, can store energy and be used as a power source. While batteries store and release charge through chemical reactions, supercapacitors store it on the surface of their electrodes. Thus, supercapacitors can charge in minutes instead of hours and can recharge millions of times. Multiple textile fibers can be spun into energy storage yarns which can be further fabricated into energy storage fabrics. There is still a need for more lightweight, compact, and mechanically flexible energy storage devices. The compositions and methods disclosed herein address these and other needs in the art.

SUMMARY

Disclosed herein are supercapacitors having a cord-yarn structure. The cord-yarn supercapacitor can include two or more ply yarns twisted together and an electrolyte. The two or more ply yarns can each comprise an activated carbon fiber yarn and a non-activated carbon fiber yarn.

The activated carbon fiber yarn can comprise a staple yarn which has been carbonized and activated. The staple yarn can be derived from a biomaterial or polymer precursor. For example, the staple yarn can be derived from cellulosics, polyacrylonitrile, phenolic resins, aromatic polyamides, polyvinyl alcohol, poly(p-phenylene benzobisoxazole) (PBO), polyesters, pitch, or combinations thereof. The activated carbon fiber yarn can have a carbon content of at least 40% by weight, based on the total weight of the activated carbon fiber yarn. For example, the carbon content can be from 40 to 85% by weight, based on the total weight of the activated carbon fiber yarn. The surface area of the activated carbon fiber yarn can be 1000 m$^2$/g or greater, such as from 1000 m$^2$/g to 2500 m$^2$/g. The activated carbon fiber yarn size can be 80 tex or less such as from 25 tex to 80 tex.

The non-activated carbon fiber yarn in the supercapacitor can be derived from a filament yarn, such as a multi filament yarn. The filament can have a bundle size of 12,000 or less such as from 500 to 12,000 or from 1,000 to 3,000.

As described herein, the cord-yarn supercapacitor can include an electrolyte. The electrolyte can be coated on a surface of each ply yarn. In some embodiments, the electrolyte can be in the form of a polymer gel. The polymer gel can include a polymer selected from polyvinyl alcohol, polyvinyl acetate, starch, or combinations thereof. The polymer gel can further include a lithium salt, phosphoric acid, sulfuric acid, potassium hydroxide, or a combination thereof. Examples of polymer gel electrolytes that can be used in the cord-yarn supercapacitor includes polyvinyl alcohol-$H_3PO_4$, polyvinyl alcohol-$H_2SO_4$, or polyvinyl alcohol-KOH. The electrolyte content can be 70% or more by weight, based on the total weight of the cord-yarn supercapacitor.

The cord-yarn supercapacitors disclosed herein can exhibit both high specific length capacitance and high specific gravimetric capacitance. In some embodiments, the cord-yarn supercapacitors can have a specific length capacitance of 67 mF cm$^{-1}$ or greater at 2 mV s$^{-1}$. The length of the cord-yarn supercapacitor can be at least 3.9 inches.

The cord-yarn supercapacitors can be modified with a nanoparticle, such as transition metal oxide (TMO) or lanthanide metal oxide nanoparticles. Specific examples of nanoparticles can include $ZnO_2$ and $CeO_2$.

Methods of producing the cord-yarn supercapacitors are also disclosed. The method can include twisting an activated carbon fiber yarn and a non-activated carbon fiber yarn to form a ply yarn having a first twist. The method can further include coating the ply yarn with an electrolyte. Two or more of the ply yarns can be twisted to form the cord-yarn supercapacitor having a second twist. The first twist (in the ply yarn) can be in an opposite direction to the second twist. In some embodiments, the first twist can be in the Z-direction and the second twist in the S-direction. The method can also include coating the cord-yarn supercapacitor with the electrolyte.

Also disclosed herein are articles such as garments that can be prepared from the cord-yarn supercapacitor.

Additional advantages of the disclosure will be set forth in part in the description which follows, and in part will be obvious from the description, or may be learned by practice of the disclosure. The advantages of the disclosure will be realized and attained by means of the elements or combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DETAILED DESCRIPTION

Figure 1:
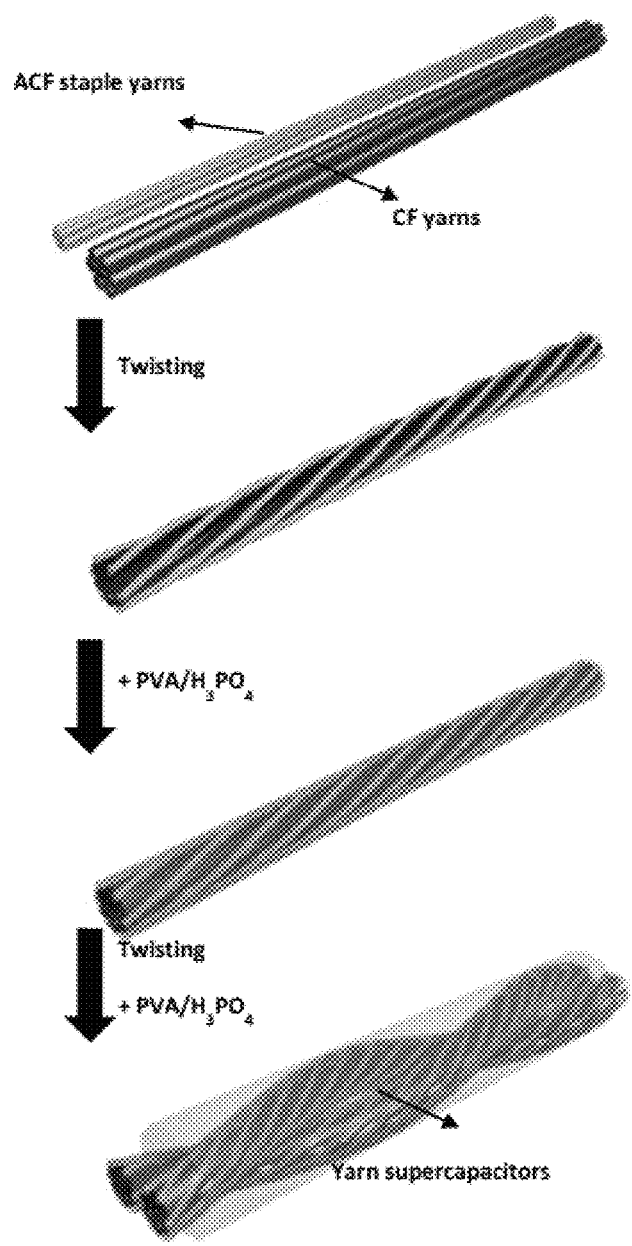
FIG. 1 is a schematic diagram illustrating an exemplary method of producing a cord-yarn supercapacitor.

The compositions, systems, and methods described herein may be understood more readily by reference to the following detailed description of specific aspects of the disclosed subject matter and the Examples and Figures included therein.

Before the present compositions, systems, and methods are disclosed and described, it is to be understood that the aspects described below are not limited to specific synthetic methods or specific reagents, as such may, of course, vary. It is also to be understood that the terminologies used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a polymer" includes mixtures of two or more such polymers, reference to "the fiber" includes two or more such fibers, reference to "an electrolyte" includes mixtures of two or more such electrolytes, and the like.

"Optional" or "optionally" means that the subsequently described event or circumstance can or cannot occur, and that the description includes instances where the event or circumstance occurs and instances where it does not.

The term "about," as used herein, is intended to qualify the numerical values which it modifies, denoting such a value as variable within a margin of error. When no particular margin of error, such as a standard deviation to a mean value given in a chart or table of data, is recited, the term "about" should be understood to mean that range which would encompass the recited value and the range which would be included by rounding up or down to that figure as well, taking into account significant figures.

The term "yarn" as used herein refers to continuous strands of fiber or filaments in a form suitable for intertwining to form a fabric. In the yarn, a number of the fibers can be twisted together or a number of filaments can be laid side-by-side without twist. The fibers can include staple fibers with discrete lengths. The difference between fibers and filaments is that fibers are significantly shorter than the filament.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Reference will now be made in detail to specific aspects of the disclosed materials, compounds, compositions, articles, and methods, examples of which are illustrated in the accompanying Examples and Figures.

Compositions and Systems

Provided herein are cord-yarn supercapacitors. The cord-yarn supercapacitor can include two or more ply yarns twisted together. For example, the cord-yarn supercapacitor can include even numbers of 2 ply yarns (single unit), 4 ply yarns (2 units), 6 ply yarns (3 units), or more ply yarns (multiple units) twisted together. Each ply yarn can include an activated carbon fiber yarn and a non-activated carbon fiber yarn.

The term "activated carbon" as used herein, refers to a material that includes a substantial amount of carbon and has been treated, such as by heating, to increase its adsorptive capacity. The activated carbon fiber yarn disclosed herein has been activated to produce a large surface area in a fiber form. It is desirable that the activated carbon fiber yarn has a large surface area. In particular, the activated carbon fiber yarn can serve as building blocks for energy storage due to their large surface area, high specific capacitance, and other unique electrical and mechanical properties. Generally, the larger the surface area is, the better the ion adsorbing capacity of the activated carbon fiber yarn. Notably, however, is that the storage capacitance of the supercapacitor can decrease when the surface area of the activated carbon fiber yarn is too large. In some embodiments, the activated carbon fiber yarn can have a surface area of 1000 $m^2/g$ or greater. For example, the activated carbon fiber yarn can have a surface area of 1100 $m^2/g$ or greater, 1200 $m^2/g$ or greater, 1400 $m^2/g$ or greater, 1500 $m^2/g$ or greater, 1600 $m^2/g$ or greater, 1800 $m^2/g$ or greater, 2000 $m^2/g$ or greater, 2200 $m^2/g$ or greater, or 2400 $m^2/g$ or greater. In some embodiments, the activated carbon fiber yarn can have a surface area of 2500 $m^2/g$ or less, 2400 $m^2/g$ or less, 2300 $m^2/g$ or less, 2200 $m^2/g$ or less, 2000 $m^2/g$ or less, or 1800 $m^2/g$ or less. In some embodiments, the activated carbon fiber yarn can have a surface area of from 1000 $m^2/g$ to 2500 $m^2/g$, from 1200 $m^2/g$ to 2500 $m^2/g$, or from 1500 $m^2/g$ to 2500 $m^2/g$. The surface area of the activated carbon fiber yarn can be determined using the Brunauer-Emmett-Teller (BET) equation. In particular, a physisorption analyzer is used to measure reduced vapor pressure due to gas adsorption of a sample, in which a known volume of gas has been added, at a cryogenic temperature. A physisorption isotherm is obtained which is then used to calculate the surface area.

The activated carbon fiber yarn may be derived from a natural or non-natural carbonaceous precursor fiber material. For example, the activated carbon fiber yarn can be derived from a biomaterial or a synthetic polymer precursor. In some embodiments, the activated carbon fiber yarn can be derived from a polymer precursor such as polyamides (including aromatic polyamides), polyesters, polyethers, polyolefins, polysaccharides, phenolic resins, phenol formaldehyde resins, polyacenaphthalenes, polyacrylethers, polyvinylchloride, polyvinylidene chloride, poly(p-phenylene terephthalamide), poly(p-phenylene benzobisoxazole), poly-L-lactide, polyimides, polyurethanes, nylons, pitch, polyacrylonitrile (including polyacrylonitrile copolymers such as poly(acrylonitrile-methyl acrylate), poly(acrylonitrile-methyl methacrylate), poly(acrylonitrile-itaconic acid-methyl acrylate), poly(acrylonitrile-vinyl pyridine), poly(acrylonitrile-vinyl chloride) and poly(acrylonitrile-vinyl acetate)), or combinations thereof. In some embodiments, the polymer precursor can include a cellulosic material. As described herein, the precursor fiber material can be carbonized and activated to form the activated carbon fiber yarn. Methods for carbonizing materials are known in the art and are also described herein.

The carbon content of the activated carbon fiber yarn may vary depending on the material from which it is derived. In some embodiments, the activated carbon fiber yarn can include 60% by weight or greater, of carbon. For example, the activated carbon fiber yarn can include 65% by weight or greater, 70% by weight or greater, 75% by weight or greater, 80% by weight or greater, 85% by weight or greater, 90% by weight or greater, or 95% by weight or greater, of carbon. In some embodiments, the activated carbon fiber yarn can include 95% by weight or less, 90% by weight or less, 85% by weight or less, 80% by weight or less, 75% by weight or less, or 70% by weight or less, of carbon. In some embodiments, the activated carbon fiber yarn can include 60% to 95% by weight, 65% to 95% by weight, 70% to 95% by weight, or 70% to 90% by weight of carbon. The carbon content of the activated carbon fiber yarn can be determined by X-ray photoelectronic spectroscopy (XPS).

The yarn size of the activated carbon fiber yarn may vary depending on the specific use of the supercapacitor. The yarn size of the activated carbon fiber yarn can influence the overall capacitance of the supercapacitor. It is believed that thicker and longer yarns can increase the ion storing capacity of the supercapacitor. In some embodiments, the activated carbon fiber yarn can have a yarn size of 25 tex or greater, 30 tex or greater, 35 tex or greater, 40 tex or greater, 45 tex or greater, 50 tex or greater, 60 tex or greater, 70 tex or greater, 75 tex or greater, or 80 tex or greater. In some embodiments, the activated carbon fiber yarn can have a yarn size of 80 tex or less, 75 tex or less, 70 tex or less, 65 tex or less, 60 tex or less, 55 tex or less, 50 tex or less, 45 tex or less, 40 tex or less, 35 tex or less, or 30 tex or less. In some embodiments, the activated carbon fiber yarn can have a yarn size of from 25 tex to 80 tex, from 25 tex to 70 tex, or from 30 tex to 60 tex.

As described herein, the activated carbon fiber yarn can be derived from a staple yarn. The term "staple yarn" can be used interchangeably with the term "spun yarn" and refers to fibers bound together by a twist.

Suitable activated carbon fiber yarns for use in the supercapacitors described herein are known in the art. For example, suitable activated carbon fiber yarns are available under the tradename KYNOL™, or ZOLTEK™.

The supercapacitors described herein can also include a non-activated carbon fiber yarn. Unlike the activated carbon fiber yarn, the non-activated carbon fiber yarn has not been treated to improve its surface area. The non-activated carbon fiber yarn can provide electrical conduction between the supercapacitor and an outer device. The conductivity of the non-activated carbon fiber yarn can be at least $0.50 \times 10^3$ s/cm, such as from $0.60-1.50 \times 10^3$ s/cm. In some embodiments, a polyaniline (PANI) fiber yarn can be used in combination with or as an alternative to the non-activated carbon fiber yarn.

The non-activated carbon fiber yarn can include 90% by weight or greater, of carbon. In some embodiments, the non-activated carbon fiber yarn can include 92% by weight or greater, 95% by weight or greater, 97% by weight or greater, 99% by weight or greater, or up to 100% by weight of carbon. In some embodiments, the non-activated carbon fiber yarn can include 100% by weight or less, 98% by weight or less, 95% by weight or less, or 93% by weight or less of carbon. In some embodiments, the non-activated carbon fiber yarn can include from 90% to 100% by weight or from 90% to 98% by weight of carbon.

The non-activated carbon fiber yarn can be derived from a filament yarn. In some embodiments, the non-activated carbon fiber yarn includes a multi-filament yarn. For example, the non-activated carbon fiber yarn can include a filament bundle of 1,000 or greater, 2,000 or greater, 3,000 or greater, 4,000 or greater, 5,000 or greater, or 6,000 or greater single filaments. In some cases, the non-activated carbon fiber yarn can include a filament bundle of up to 12,000 single filaments. In some embodiments, the non-activated carbon fiber yarn can include a filament bundle of from 1,000 to 12,000, from 1,000 to 6,000, from 2,000 to 5,000, or from 2,000 to 4,000 single filaments. The diameter of each single filament in the multi-filament yarn can be from 7-12 microns.

Suitable non-activated carbon fiber yarns for use in the supercapacitor are known in the art. For example, non-activated carbon fiber yarns are available under the tradename Zoltek® PX30 (from Toray Group), Cytec® (from Cytec Engineered Materials), and HexTow® (from Hexcel).

The cord-yarn supercapacitors described herein can include an electrolyte. The electrolyte provides a charge reservoir for the supercapacitor. For example, the electrolyte can enter the pores of the electrode materials (activated and non-activated carbon fiber yarns) and provide ionic charge carriers for charge storage.

The electrolyte can be chosen so as to minimize internal resistance of the supercapacitor. For instance, the size of the electrolyte ions may affect their accessibility to the pores of the activated carbon fiber electrode, which, in turn, may influence the extent of the electrical double layer formation. In some embodiments, the electrolyte in supercapacitors can include an organic electrolyte. Organic electrolytes can withstand higher operating voltages due to higher electrochemical decomposition limits than those of aqueous electrolytes. The electrolyte can be a fluid such as a liquid, a semi-solid, or a gel.

In some embodiments, the electrolyte can include a polymer gel. Polymer gel electrolytes have high electrical potential resistance and are less susceptible to leakage problems that can occur with liquid electrolytes. Polymer gel electrolytes are polymer-electrolyte systems in which a polymer forms a matrix for the electrolyte species. Examples of suitable polymers that can be used in the polymer gel electrolytes can include polyvinyl alcohol, polyvinyl acetate, cellulosics such as starch, polyurethane, poly(acrylonitrile), polyacrylamide, poly(ethylene oxide), poly(meth)acrylate, or combinations thereof. In some embodiments, the polymer gel electrolyte can include polyvinyl alcohol (PVA). The molecular weight of the polymer (such as PVA) in the polymer gel can be 20,000 Da or greater, such as from 20,000 to 200,000 Da, from 20,000 to 150,000 Da, or from 20,000 to 100,000 Da. The molecular weight of the polymer may affect the formation condition, such as drying temperature and drying time, and the mechanical strength, such as tensile strength, of the polymer gel electrolyte.

In addition to the polymer, the polymer gel can also include an additional material that can increase the ionic conductivity of the polymer. For example, the polymer gel can include an additional material selected from a lithium salt (for e.g., $LiCl_4$, $LiBF_4$, $LiPF_6$, $LiAsF_6$, $LiCF_3SO_3$, LiBr, $LiCF_3SO_3$, $LiN(CF_3SO_3)_2$), $H_3PO_4$, $H_2SO_4$, KOH, or a combination thereof.

A plasticizer can also be a component of the polymer-electrolyte system.

In some examples, the polymer gel can include an electrolyte system selected from polyvinyl alcohol-$H_3PO_4$, polyvinyl alcohol-$H_2SO_4$, polyvinyl alcohol-KOH, polyvinyl acetate-$H_3PO_4$, polyvinyl acetate-$H_2SO_4$, polyvinyl acetate-KOH, polyurethane-$LiCF_3SO_3$, polyurethane-lithium perchlorate, a poly(acrylonitrile)-lithium salt, a poly(acrylonitrile)-quaternary ammonium salt, polyacrylamide-$H_3PO_4$, polyacrylamide-$H_2SO_4$, polyacrylamide-KOH, a poly(ethylene oxide)-grafted poly(methyl)-methacrylate-quaternary ammonium salt, or a combination thereof. The polymer and the additional electrolyte material can be in a weight ratio of from 1:1 to 5:1.

Other suitable examples of organic electrolytes that can be used in the supercapacitors include tetraalkylammonium salts, also known as quaternary ammonium salts or organic carbonates such as ethylene carbonate, propylene carbonate, propanediol-1,2-carbonate, and dichloroethylene carbonate.

The electrolyte content can be 70% or more by weight, based on the total weight of the cord-yarn supercapacitor. In some embodiments, the electrolyte content can be 75% or greater by weight, 80% or greater by weight, 85% or greater by weight, or 90% or greater by weight, based on the total weight of the cord-yarn supercapacitor. In some embodiments, the electrolyte content can be 90% or less by weight, 85% or less by weight, 80% or less by weight, 75% or less by weight, or 70% or less by weight, based on the total weight of the cord-yarn supercapacitor. In some embodiments, the electrolyte content can be from 70% to 95% by weight or from 70% to 90% by weight, based on the total weight of the cord-yarn supercapacitor.

The electrolyte can be coated directly or indirectly onto a surface of the activated carbon fiber yarn or the non-activated carbon fiber yarn. In some embodiments, the electrolyte can be coated onto a surface of the ply yarn comprising the activated carbon fiber yarn and the non-activated carbon fiber yarn, as disclosed herein. In some examples, the activated carbon fiber yarn and/or the non-activated carbon fiber yarn can be coated with a polymer gel.

The cord-yarn supercapacitors described herein can further include nanoparticle. The term "nanoparticle" as used herein, refers to any structure with one or more nanosized features. A nanosized feature can be any feature with at least one dimension less than 1 μm in size. The nanoparticle can have any of a wide variety of shapes including for example, spheroidal and elongated nanostructures. Thus, the term nanoparticle includes nanowires, nanotubes, spheroidal nanoparticles, and the like, or combinations thereof.

The nanoparticles can have an average diameter of 900 nanometers (nm) or less such as from 5 nm to 700 nm, from 5 nm to 500 nm, from 50 nm to 500 nm, or from 50 nm to 250 nm. The nanoparticles can be encapsulated within the supercapacitor (for example, the activated carbon fiber yarn, the non-activated carbon fiber yarn, or the electrolyte), dispersed throughout the supercapacitor, or form a layer/coating on the supercapacitor. The nanoparticles can attach permanently or semi-permanently to the supercapacitor. The nanoparticles can adhere to the activated carbon fiber yarn covalently or non-covalently. In some cases, the nanoparticle is unreactive with the supercapacitor.

In some embodiments, the nanoparticle can include transition metals or lanthanide metals, such as iron, silver, cerium, zinc, gold, copper, cobalt, nickel, platinum, manganese, rhodium, ruthenium, palladium, titanium, vanadium, chromium, molybdenum, cadmium, mercury, calcium, aluminum, zirconium, iridium, silicon, an oxide thereof, zeolite, graphite, carbon nanotubes, or a combination thereof. Specific examples of nanoparticles include transition metal oxides or lanthanide metal oxides, such as cerium oxide, titanium oxide, tin oxide, iron oxide, cesium oxide, zinc oxide, alumina, silica, or a combination thereof.

The cord-yarn supercapacitor can comprise 5% or greater by weight nanoparticle. For example, the cord-yarn supercapacitor can comprise from 5% to 55%, 10% to 50%, 10% to 40%, 10% to 30%, 15% to 35%, or 15% to 30% by weight, based on the weight of the cord-yarn supercapacitor.

In the cord-yarn supercapacitors disclosed herein, the activated carbon fiber yarn and non-activated carbon fiber yarn can be combined to form a ply yarn. The term "ply yarn" as used herein refers to individual yarns which are twisted together to yield a yarn structure. In the present disclosure, the activated carbon fiber yarn and non-activated carbon fiber yarn can be twisted together to form the ply yarn. The ply yarn can include an assembly of two or more individual yarns twisted together. Thus, the term ply yarn is inclusive of yarns formed from 2, 4, 6, 8, or more individual yarns. The number of activated carbon fiber yarn and non-activated carbon fiber yarn in the ply yarn can be the same or different.

The cord-yarn supercapacitor can include two or more ply yarns as disclosed herein, twisted together. In some embodiments, the cord-yarn supercapacitor can include 2, 4, 6, 8, or more even numbers of ply yarns. The cord-yarn can be twisted in a direction opposite to that of the two or more ply yarns. For example, each of the ply yarns can include a first twist and the cord-yarn supercapacitor can include a second twist. In some embodiments, the first twist can be in the Z-direction and the second twist in the S-direction. In some embodiments, the first twist can be in the S-direction and the second twist in the Z-direction. The twist in the ply yarns (first twist) can be in a direction opposite to that of its component individual yarns.

The cord-yarn supercapacitor can have any suitable dimensions depending on its specific use. In some embodiments, the cord-yarn supercapacitor can have a length of at least 3.9 inches, such as 4 inches or greater, 5 inches or greater, 6 inches or greater, 8 inches or greater, 10 inches or greater, 12 inches or greater, 15 inches or greater, 18 inches or greater, or 20 inches or greater. In some embodiments, the cord-yarn supercapacitor can have a length of from 3.9 inches to 20 inches or from 3.9 inches to 10 inches. In some embodiments, the cord-yarn supercapacitor can have a thickness of 500 μm or greater, such as 550 μm or greater, 600 μm or greater, 700 μm or greater, 800 μm or greater, 900 μm or greater, 1,000 μm or greater, 1500 μm or greater, 2,000 μm or greater, 2,500 μm or greater, or 3,000 μm or greater. In some embodiments, the cord-yarn supercapacitor can have a thickness of 3,000 μm or less, 2,500 μm or less, 2,000 μm or less, 1,500 μm or less, or 1,000 μm or less. In some embodiments, the cord-yarn supercapacitor can have a thickness of from 500 μm to 3,000 μm, from 500 μm to 2,000 μm, or from 1,000 μm to 2,000 μm, depending on the packing density.

The cord-yarn supercapacitors described herein can exhibit a high specific length capacitance, such as 10 mF $cm^{-1}$ or greater, 15 mF $cm^{-1}$ or greater, 20 mF $cm^{-1}$ or greater, 30 mF $cm^{-1}$ or greater, 40 mF $cm^{-1}$ or greater, 50 mF $cm^{-1}$ or greater, 60 mF $cm^{-1}$ or greater, 65 mF $cm^{-1}$ or greater, 67 mF $cm^{-1}$ or greater, 69 mF $cm^{-1}$ or greater, 70 mF $cm^{-1}$ or greater, 75 mF $cm^{-1}$ or greater, 80 mF $cm^{-1}$ or greater, 85 mF $cm^{-1}$ or greater, 90 mF $cm^{-1}$ or greater, 95 mF $cm^{-1}$ or greater, or 100 mF $cm^{-1}$ or greater at 2 mV $s^{-1}$. The cord-yarn supercapacitor can also exhibit a high gravimetric capacitance of 74 F $g^{-1}$ or greater, 75 F $g^{-1}$ or greater, 77 F $g^{-1}$ or greater, 80 F $g^{-1}$ or greater, 82 F $g^{-1}$ or greater, 85 F $g^{-1}$ or greater, 90 F $g^{-1}$ or greater, 95 F $g^{-1}$ or greater, or 100 F $g^{-1}$ or greater, at 2 mV $s^{-1}$. The capacitance performance of the supercapacitor can be determined by galvanostatic charge-discharge, cyclic voltammetry, and AC impedance techniques.

Methods

Methods of making the cord-yarn supercapacitors described herein are also disclosed. The method can include providing an activated carbon fiber yarn and a non-activated carbon fiber yarn. As described herein, the activated carbon fiber yarn can be derived from a precursor fiber material that has been carbonized and activated.

Methods for carbonizing and activating materials are known in the art. For example, carbonizing the precursor fiber material can include heating the precursor fiber material under an inert environment to remove non-carbon elements. Carbonization can start to occur at about 300° C. and the end temperature can be between about 800 and 1000° C., depending on the specific fiber material used. In the activation step, steam or $CO_2$ can be used to react with carbon to create angstrom sized pores. In some embodiments, activation using chemicals (e.g., $H_3PO_4$ and/or $ZnCl_2$) can be carried out. Activation can start to occur at about 300° C. to greater to about 800° C. The carbonization and activation reaction can be performed in a single step. In some examples, an activated carbon fiber can be produced beginning with the precursor fiber material, which is first mixed with water or other appropriate aqueous solvent to produce a wet mass. In some examples, from 30% to 70% by weight (e.g., 40% to 60% by weight) of the precursor carbon fabric and from 30% to 70% by weight (e.g., 40% to 60% by weight) of water can be mixed. The precursor material can be carbonized at a temperature in the range of about 400 to 950° C., for example at about 900° C. under nitrogen flow.

As described herein, a nanoparticle, such as a transition metal oxide or a lanthanide metal oxide can be incorporated into the cord-yarn supercapacitor. Methods for incorporating the nanoparticle into the cord-yarn supercapacitor can include dispersing the nanoparticle in a solvent to form a suspension. In some embodiments, the suspension can include 1% or greater (e.g., 2% or greater, 5% or greater, 6% or greater, 8% or greater, 10% or greater, 12% or greater, from 1% to 20%, from 1% to 15%, from 1% to 10%, from 2% to 10%) by weight of nanoparticle. Suitable solvents can include water or an alcohol. The method can further include contacting the activated carbon fiber yarn with the nanoparticle suspension. For example, the activated carbon fiber yarn, used to construct two electrodes in the fabric supercapacitor, can be immersed in the nanoparticle suspension to adsorb the nanoparticle via an ultrasonic dispersion. The nanoparticle-loaded electrode yarn can be dried, for example, in an oven at 60° C.

After activation, the method of making the cord-yarn supercapacitors can include twisting the activated carbon fiber yarn and the non-activated carbon fiber yarn to form a ply yarn. The activated carbon fiber yarn and the non-activated carbon fiber yarn can be ply-twisted together at 2 to 15 turns per inch in a direction which is opposite to the twist direction in the activated carbon fiber yarn. In some embodiments, the ply-twisted yarn can have a "Z" twist. Methods for ply twisting are known in the art. In some embodiments, ply twisting can be achieved utilizing a twist tester or other equipment sold by manufacturers such as Volkmann and Muratec (formerly Murata).

The method of making the cord-yarn supercapacitors can also include coating the ply yarn with an electrolyte as described herein. The coating can be applied by dipping, brushing, or spraying. As discussed herein, the electrolyte can include a polymer gel. The components of the polymer gel can be applied simultaneously or sequentially. For example, the ply yarns can be coated simultaneously with a polymer gel comprising a polymer and an additional material that can increase the ionic conductivity of the polymer. Alternately, the ply yarns can be coated sequentially with a polymer followed by moistening with water or a solution that can increase the ionic conductivity of the polymer. After coating, the ply yarn is allowed to dry such as by blow drying.

The method of making the cord-yarn supercapacitors can further include preparing a cord-yarn from two or more ply yarns. The method can include twisting the two or more ply yarns together to form the cord-yarn supercapacitor. The final twist of the cord-yarn can be applied in the opposite direction of the ply twist. For example, the cord-yarn supercapacitor can have an SZS form, with S-twisted activated carbon fiber yarn made into Z-twisted ply yarn that are then combined with an S-twist. In another embodiment, the cord-yarn supercapacitor can have a ZSZ form. In yet another embodiment, the cord-yarn can have a SSZ or a ZZS pattern.

The cord-yarn supercapacitor can be further coated with an electrolyte, using methods as disclosed herein and then dried. The solidified electrolyte gel not only act as an electrolyte in the cord-yarn supercapacitor but also as a separator between the two yarn electrodes.

The cord-yarn supercapacitors disclosed herein provide a rope-format linear structure with great flexibility. Therefore, the cord-yarn supercapacitor is bendable, knottable, and weavable. This unique linear structure allows the supercapacitor to find use in many special applications, including in textiles such as apparel products, protective clothing, outdoor activity products, sports wears, electronic devices, conducting wires and cables, electrochemical devices such as fiber-based supercapacitors, batteries, fuel cells, artificial muscles, and electrochromic articles, field emission and incandescent light emission devices, tissue scaffold applications, and mechanical and chemical sensors.

In some embodiments, the cord-yarn supercapacitors can be woven into a fabric or as a portion of a fabric. The fabrics can be made into apparels such as coats, coveralls, jackets, pants, sleeves, aprons, and other types of apparel. The fabrics described herein are useful in and can be incorporated into special applications to produce self-energy supply systems, such as for people working in rural areas or being deployed for military operations. In some embodiments, it may be desirable that the fabric contains filaments which are fire-resistant or other desirable properties. Suitable fire-resistant filaments include those made from aramids such as poly (para-phenylene terephthalamide) (PPD-T), poly(meta-phenylene isophthalamide) (MPD-I), and other high strength polymers such as poly-phenylene benzobisoxazole (PBO) and/or blends or mixtures of those fibers.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Preparation of a Cord-Yarn Supercapacitor

General: Single activated carbon fiber (ACF) yarn derived from a staple yarn spun with a precursor fiber followed by carbonization and activation was used for the electrode component. A single non-activated carbon fiber (CF) derived from a multifilament yarn with commercial grade 3K was used as a conducting component. A polymer gel was used as the electrolyte component. The polymer gel was prepared by dissolving 5 g of PVA in 50 ml of deionized water to form a mixture. The mixture was then heated to 90° C. under continuous stirring until the solution became transparent. 5 g of $H_3PO_4$ was added to the mixture with stirring to form a homogeneous PVA-$H_3PO_4$ electrolyte gel.

Method: The process of making the cord-yarn supercapacitor is illustrated in FIG. 1. Specifically, the single ACF spun yarn and the single CF filament yarn were twisted in the Z direction to form a ply yarn having 5 twists per inch (TPI). A twist tester was used for twisting. The ply yarn was stabilized by applying a thin layer of the PVA-$H_3PO_4$ electrolyte gel, followed by drying with a blower. Two ply-yarns were mounted on the twist tester for S twisting to form the cord-yarn structure having 5 TPI. The cord-yarn was coated with a thin layer of the electrolyte gel for final stabilization.

The capacitance was determined using the equation $$C = \frac{Q}{2\Delta V} = \frac{1}{2v\Delta V}\int_{V_-}^{V_+} i(V)dV,$$

where Q is the total charge obtained by integrating the area within cyclic voltammetry (CV) curves; $\Delta V$ is the potential window; v is the scan rate; and i(V) is current intensity.

For comparison, a bundle of CFs were firstly twisted tightly using the yarn twist tester in a Z twist (left turn). Sixteen (16) mg of ACF staple yarns (12 cm) were wrapped around the CFs. After wrapping, the CF and ACF were coated with a thin layer of PVA-$H_3PO_4$ gel and dried to obtain the yarn electrode. In accordance with the same operation procedure, two yarn electrodes of the same length were made into the supercapacitor.

Figure 2:
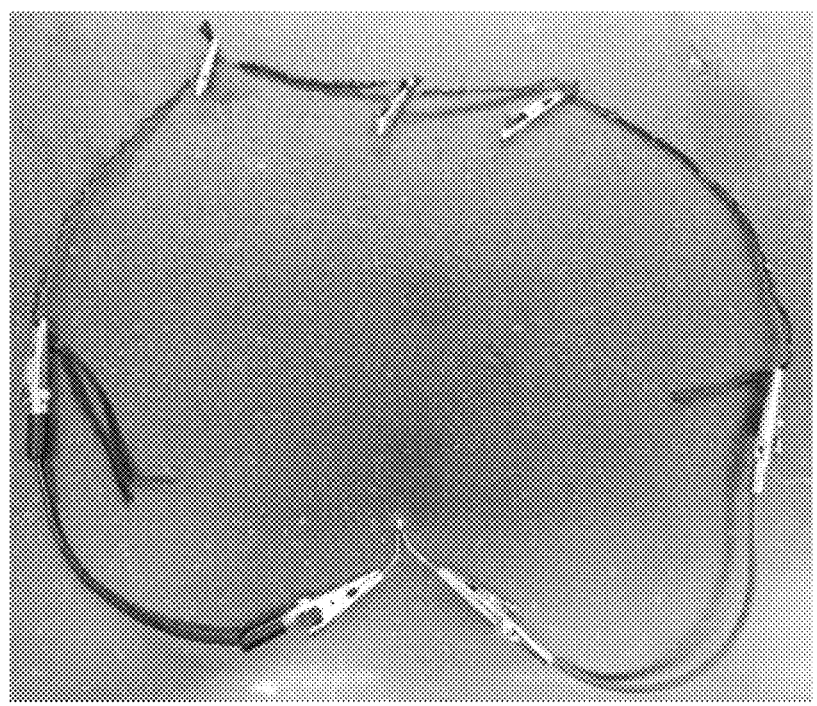
FIG. 2 is a diagram showing a cord-yarn structured supercapacitor assembly.

Results: The produced cord-yarn supercapacitor provided a rope-format linear structure with great flexibility (See FIG. 2). The cord-yarn supercapacitor, having a length of 10 cm, exhibited a high specific length capacitance of 67 mF $cm^{-1}$ and a high gravimetric capacitance of 74 F $g^{-1}$. The equivalent serial internal resistance (ESR) of the cord-yarn supercapacitor was 1.3 $\Omega cm^{-1}$.

Figure 3:
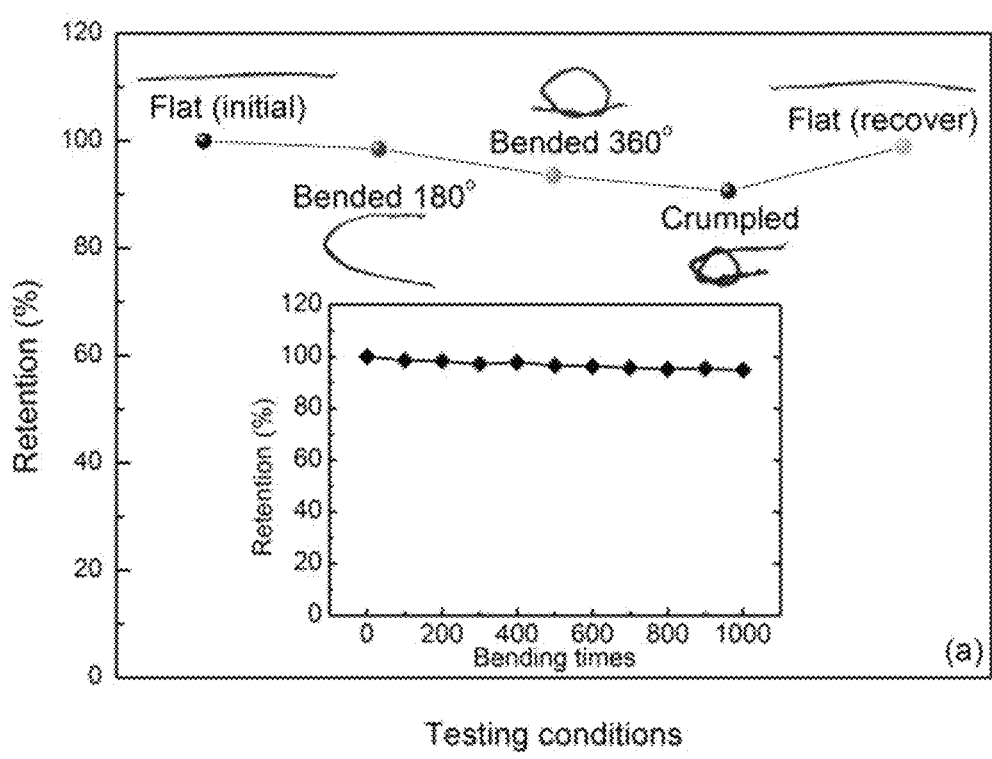
FIG. 3 is a diagram showing the flexibility of a cord yarn supercapacitor as determined by measuring the capacitance stability under different angles.

The flexibility of the supercapacitor was tested by measuring the capacitance stability under different angles as shown in FIG. 3. Only very little capacitive decay was observed when the device was bended and deformed. Even when severely crumpled, the supercapacitor remained 90.6% of the initial specific capacitance and recovered some capacitance after being flattened. As seen from the inset, a 94.8% retention rate was observed after 1000 bending (360°) cycles.

The electrochemical performance of the supercapacitor prepared by wrapping ACFs on CFs was decreased compared to the supercapacitor prepared by twisting.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A cord-yarn supercapacitor comprising
   (a) two or more ply yarns twisted together, each ply yarn comprising an activated carbon fiber yarn and a non-activated carbon fiber yarn, wherein the activated carbon fiber yarn comprises a staple yarn which has been carbonized and activated; and
   (b) an electrolyte coated on a surface of each ply yarn, wherein the cord-yarn supercapacitor has a specific length capacitance of 67 mF $cm^{-1}$ or greater at 2 mV $s^{-1}$.

2. The cord-yarn supercapacitor of claim 1, wherein the activated carbon fiber yarn has a surface area of from 1,000 $m^2/g$ to 2,500 $m^2/g$.

3. The cord-yarn supercapacitor of claim 1, wherein the staple yarn includes cellulosics, polyacrylonitrile, phenolic resins, aromatic polyamides, polyvinyl alcohol, poly(p-phenylene benzobisoxazole) (PBO), polyesters, pitch, or combinations thereof.

4. The cord-yarn supercapacitor of claim 1, wherein the activated carbon fiber yarn has a carbon content from 60 to 95% by weight, based on the total weight of the activated carbon fiber yarn.

5. The cord-yarn supercapacitor of claim 1, wherein said activated carbon fiber yarn has a yarn size of from 25 to 80 tex.

6. The cord-yarn supercapacitor of claim 1, wherein the non-activated carbon fiber yarn is a multi filament yarn.

7. The cord-yarn supercapacitor of claim 1, wherein the non-activated carbon fiber yarn has a filament bundle size of from 500 to 12,000 single filaments.

8. The cord-yarn supercapacitor of claim 1, wherein the electrolyte comprises a polymer gel.

9. The cord-yarn supercapacitor of claim 8, wherein the polymer gel comprises a polymer selected from polyvinyl alcohol, polyvinyl acetate, starch, or combinations thereof.

10. The cord-yarn supercapacitor of claim 8, wherein the polymer gel comprises a lithium salt, phosphoric acid, sulfuric acid, potassium hydroxide, or a combination thereof.

11. The cord-yarn supercapacitor of claim 1, wherein the electrolyte content is 70% or more by weight, based on the total weight of the cord-yarn supercapacitor.

12. The cord-yarn supercapacitor of claim 1, wherein each of the ply yarns comprise a first twist and the two or more ply yarns are twisted to form a second twist, and wherein the first twist and the second twist are in opposite directions.

13. The cord-yarn supercapacitor of claim 12, wherein the first twist is in the Z-direction and the second twist is in the S-direction.

14. The cord-yarn supercapacitor of claim 1, having a length of at least 3.9 inches.

15. An article comprising the cord-yarn supercapacitor of claim 1.

16. A garment comprising the cord-yarn supercapacitor of claim 1.

17. A method of producing a cord-yarn supercapacitor of claim 1, the method comprising:
   (a) twisting the activated carbon fiber yarn and the non-activated carbon fiber yarn to form a ply yarn having a first twist, wherein the activated carbon fiber yarn comprises the staple yarn which has been carbonized and activated;

(b) coating the ply yarn with the electrolyte;

(c) twisting two or more of the ply yarns to form the cord-yarn supercapacitor having a second twist;

(d) coating the cord-yarn supercapacitor with the electrolyte, wherein the cord-yarn supercapacitor has a specific length capacitance of 67 mF cm$^{-1}$ or greater at 2mV s$^{-1}$.

18. The method of claim 17, wherein the second twist is in the opposite direction of the first twist.

19. The method of claim 18, wherein the first twist is in the Z-direction and the second twist is in the S-direction.

20. The method of claim 17, wherein the electrolyte comprises a polymer gel.

* * * * *